H. E. ARGO.
GREASE CUP.
APPLICATION FILED MAR. 12, 1917.

1,229,012.

Patented June 5, 1917.

WITNESSES
F. E. Barry
H. E. Beck

INVENTOR
Horace E. Argo
BY
ATTORNEYS

UNITED STATES PATENT OFFICE.

HORACE E. ARGO, OF OAK PARK, ILLINOIS.

GREASE-CUP.

1,229,012.

Specification of Letters Patent.

Patented June 5, 1917.

Application filed March 12, 1917. Serial No. 154,241.

*To all whom it may concern:*

Be it known that I, HORACE EVERETT ARGO, a citizen of the United States, and a resident of Oak Park, in the county of Cook and State of Illinois, have invented an Improvement in Grease-Cups, of which the following is a specification.

My invention is an improvement in grease cups, and has for its object to provide a device of the character specified adapted to be arranged within an oil cup, for conducting the grease or oil to the shaft or the like to be greased, and which will be automatically operated to feed the oil or grease by the rotation and vibration of the shaft, and the weight of the grease.

The present embodiment of the invention is shown in connection with an oil cup 1 of usual construction, which at its lower end is threaded into an opening in the upper section 2 of the bearing 2—3, in which the shaft 4 is journaled.

Figure 1:
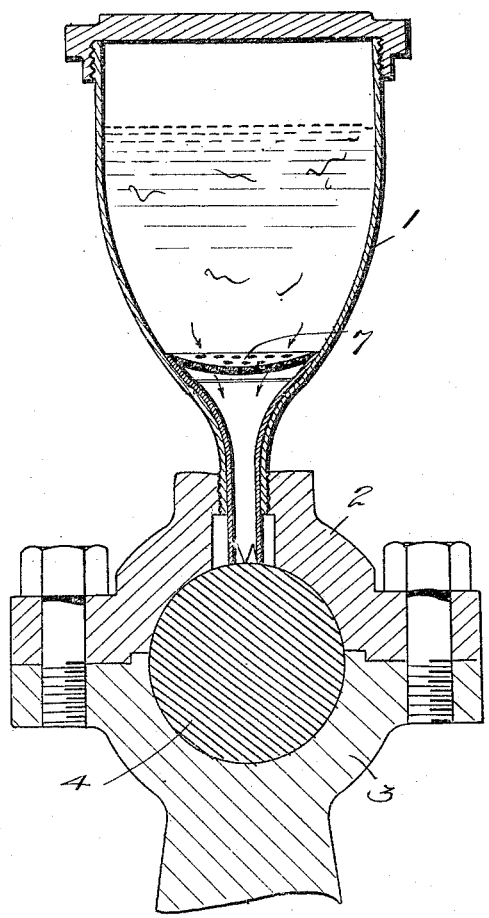
Figure 1 is a sectional view showing the device in place.
Figure 2:
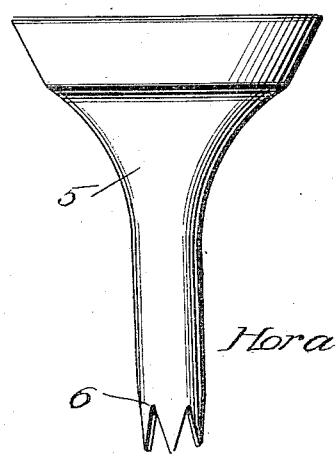
Fig. 2 is a front view of the device removed.

The improvement comprises a funnel-shaped casing 5 having its lower end notched, as shown at 6, to provide a series of points or teeth 7, which are adapted to rest upon the shaft when the cup is in place. The cup is of such size and shape that when dropped into the oil cup, as shown in Fig. 1, the flaring upper end will engage the flaring portion of the oil cup and will fit the same, and hold the device with the teeth just touching the shaft. At its upper end the cup has a concave perforate cover or top, and the grease in the oil cup 1 rests upon this top and is strained through the perforations.

By the tubular portion of the cup the grease is conducted to the shaft, and the continuous movement of the shaft will operate the device something in the manner of a pump, giving it a slight upward and downward movement. In this manner the grease or oil will be forced through the perforations to provide sufficient oil or grease for the part to be lubricated.

I claim:

A device of the character specified, adapted for use with oil cups for oiling bearings for shafts and the like, and comprising a funnel-shaped member having a concave perforate top, the flaring portion of the said member being adapted to engage within the cup at the bottom thereof and to support the funnel-shaped member with the lower end thereof touching the part to be oiled, said lower end being notched to form a series of teeth or points for touching the object to be lubricated.

HORACE E. ARGO.

Witnesses:
LIONEL C. LENZ,
ERNEST G. TROY.

Copies of this patent may be obtained for five cents each, by addressing the "Commissioner of Patents, Washington, D. C."